(12) United States Patent
Ponsford et al.

(10) Patent No.: US 9,798,564 B2
(45) Date of Patent: Oct. 24, 2017

(54) MINIMIZING VIRTUAL MACHINE PROVISIONING COST BASED ON RECEIVED SOFTWARE LICENSING AND USER FEE INFORMATION

(75) Inventors: Simon Ponsford, Doha (QA); William Yip, Doha (QA)

(73) Assignee: Qatar Foundation, Doha (QA)

( * ) Notice: Subject to any disclaimer, the term of this patent is extended or adjusted under 35 U.S.C. 154(b) by 164 days.

(21) Appl. No.: 14/411,436

(22) PCT Filed: Jun. 27, 2012

(86) PCT No.: PCT/EP2012/062441
§ 371 (c)(1),
(2), (4) Date: Jul. 31, 2015

(87) PCT Pub. No.: WO2014/000782
PCT Pub. Date: Jan. 3, 2014

(65) Prior Publication Data
US 2015/0339146 A1    Nov. 26, 2015

(51) Int. Cl.
*G06F 9/455* (2006.01)
*G06F 9/50* (2006.01)
*G06Q 10/06* (2012.01)

(52) U.S. Cl.
CPC ...... *G06F 9/45558* (2013.01); *G06F 9/45533* (2013.01); *G06F 9/5005* (2013.01); *G06F 9/5027* (2013.01); *G06F 9/5077* (2013.01); *G06F 2009/4557* (2013.01); *G06Q 10/06* (2013.01)

(58) Field of Classification Search
CPC ............ G06F 9/45558; G06F 9/45533; G06F 9/5027; G06F 9/5077; G06F 9/5005; G06F 2009/4557; G06Q 10/06
See application file for complete search history.

(56) References Cited

U.S. PATENT DOCUMENTS

| | | | |
|---|---|---|---|
| 8,196,210 B2* | 6/2012 | Sterin | G06F 21/105 705/59 |
| 8,261,277 B2* | 9/2012 | Prabhakar | G06F 9/5044 709/201 |
| 8,396,807 B1* | 3/2013 | Yemini | G06Q 10/06 705/400 |

(Continued)

OTHER PUBLICATIONS

Li et al., "The Method and Tool of Cost Analysis for Cloud Computing" 2009 IEEE International Conference on Cloud Computing, Sep. 21-25, 2009.*

*Primary Examiner* — Benjamin Wu
(74) *Attorney, Agent, or Firm* — Martin & Ferraro, LLP

(57) ABSTRACT

An arrangement configured to allocate one or more resources of one or more computing devices to a virtual machine, the arrangement comprising: an interface configured to receive a request for the allocation of one or more resources to the virtual machine, the request including information regarding one or more computer programs to be operated by or as a part of the virtual machine; and a hypervisor module configured to use the information regarding one or more computer programs to identify economic information associated with at least one of the computer programs, and to allocate one or more resources to the virtual machine based at least in part on the economic information.

18 Claims, 7 Drawing Sheets

(56) References Cited

U.S. PATENT DOCUMENTS

Figure 1:
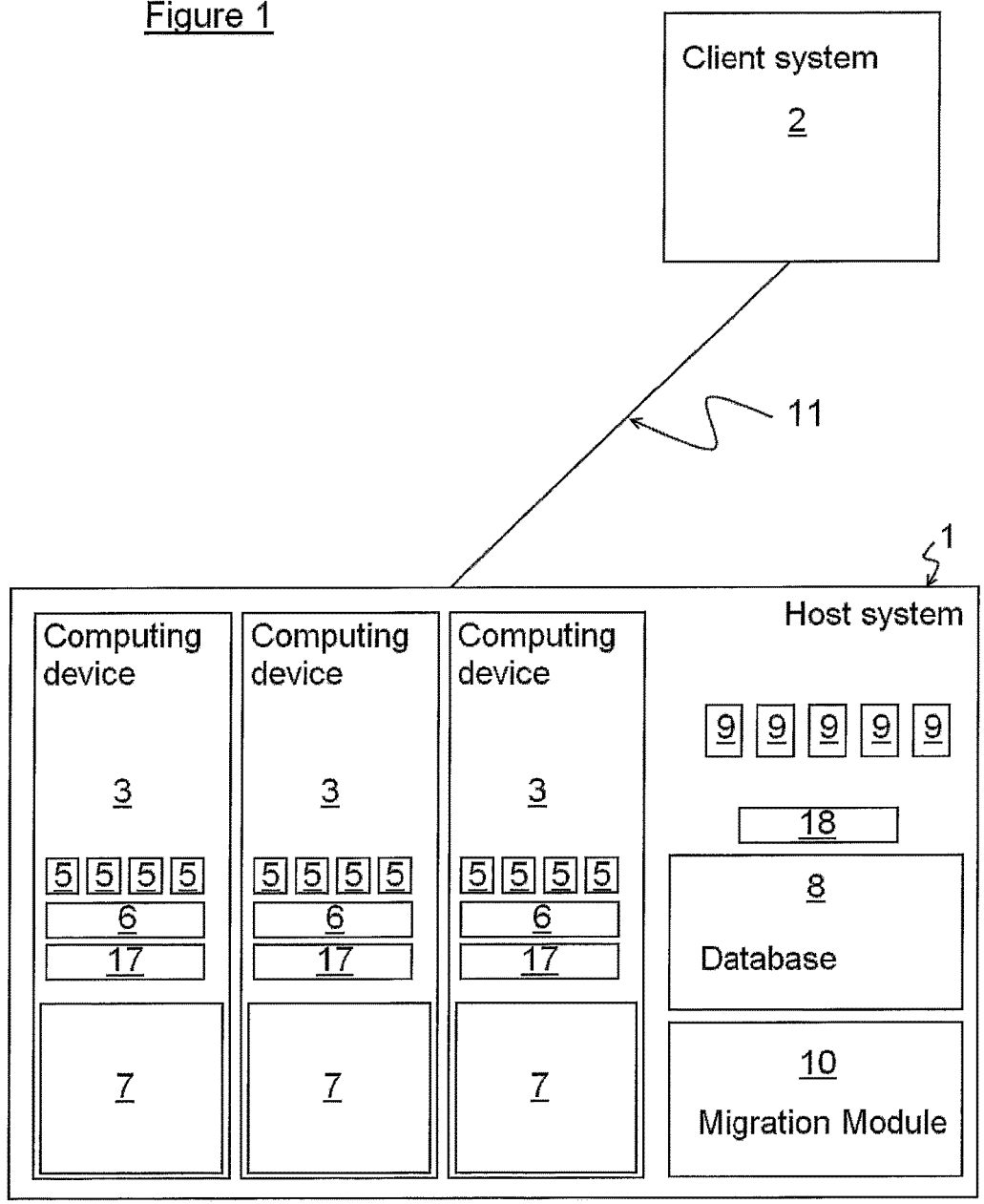

| | | | |
|---|---|---|---|
| 8,464,266 B2* | 6/2013 | Jackson | G06F 21/6218 718/104 |
| 8,566,391 B2* | 10/2013 | Saito | G06F 21/105 709/203 |
| 8,793,365 B2* | 7/2014 | Arsovski | G06F 9/5027 709/224 |
| 8,914,511 B1* | 12/2014 | Yemini | G06Q 10/06 705/7.35 |
| 9,015,324 B2* | 4/2015 | Jackson | G06F 9/5027 709/201 |
| 2005/0188088 A1* | 8/2005 | Fellenstein | G06F 9/5011 709/226 |
| 2006/0143617 A1* | 6/2006 | Knauerhase | G06F 9/50 718/104 |
| 2008/0183626 A1* | 7/2008 | Romero | G06F 21/105 705/59 |
| 2010/0058349 A1* | 3/2010 | Diwakar | G06F 9/5044 718/104 |
| 2010/0293619 A1* | 11/2010 | Hayami | G06F 21/121 726/27 |
| 2011/0119191 A1* | 5/2011 | Stern | G06F 9/45533 705/59 |
| 2011/0238672 A1* | 9/2011 | Agarwala | H04L 67/1097 707/748 |
| 2012/0041844 A1* | 2/2012 | Shen | G06Q 30/06 705/26.61 |
| 2012/0089410 A1* | 4/2012 | Mikurak | G06Q 10/00 705/1.1 |
| 2012/0216269 A1* | 8/2012 | Yeung | G06F 21/10 726/11 |
| 2012/0260248 A1* | 10/2012 | Katiyar | G06F 9/45533 718/1 |
| 2012/0331114 A1* | 12/2012 | Garg | G06Q 10/00 709/220 |
| 2013/0042003 A1* | 2/2013 | Franco | H04L 67/1097 709/226 |
| 2013/0268940 A1* | 10/2013 | Gmach | G06F 9/5077 718/104 |
| 2016/0371109 A1* | 12/2016 | Palavalli | G06F 9/45558 |

* cited by examiner

MINIMIZING VIRTUAL MACHINE PROVISIONING COST BASED ON RECEIVED SOFTWARE LICENSING AND USER FEE INFORMATION

This is a National Phase Application under 35 USC 371 of PCT/EP2012/062441 filed Jun. 27, 2012 (published on Jan. 3, 2014 as WO 2014/000782), which is incorporated herein by reference.

DESCRIPTION OF INVENTION

Embodiments of the present invention relate to arrangements for use in the allocation of one or more resources of one or more computing devices to a virtual machine. Embodiments of the invention include associated methods and host systems.

Virtual machines are used in order to provide multiple operating system environments on the same computing device. Virtual machines are of particular use in relation to cloud computing systems and other distributed processing systems in which a plurality of users share the resources of one or more computing devices.

One or more computing devices which host one or more virtual machines are generally collectively called a "host system". The host system has various available resources. These resources may include, for example, available processing power (e.g. a processing unit or a part of a processing unit) and memory.

When a client system initiates a virtual machine and resources are requested from a host system, the host system will allocate available resources to the virtual machine which then operates using those resources. Of course, the host system can only allocate available resources and the more virtual machines that are operated by the host system the fewer the available resources for allocation.

A typical host system has a plurality of computing devices. A problem arises in the efficient allocation of the resources of the computing devices to virtual machines by a host system in order to make the best use of the resources of the host system.

Problems associated with the efficient allocation of resources are exasperated by the often dynamic nature of the resource requests. For example, a client system may request further resources after an initial resource request and allocation by the host system. In addition, of course, once a client system no longer requires resources, they may be relinquished to the host system and made available for allocation again. This can lead to resources being managed in an inefficient manner as host systems are often required to operate to provide flexibility for client systems.

Efforts to cater for the dynamic nature of resource requests can result in inefficient allocation of resources as, although not allocated, some resources may be reserved in anticipation of a potential request for additional resources. These reserved, but unallocated, resources are unused unless and until a further request is made and so the resources of the host system are not being used to their full potential.

For example, the resources of a first computing device of a host system may be allocated to two virtual machines, first and second virtual machines. The allocated resources of the first computing device may be a part of the total resources of the first computing device such that some of the resources remain available. Accordingly, if the first (or second) virtual machine requires more resources then the remaining available resources of the first computing device can be readily allocated. If another virtual machine is required (a third virtual machine), then the host system will need to allocate resources from another computing device, a second computing device—this may be the case even if the available resources of the first computing device are sufficient to meet the requirements of the third virtual machine but the available resources are reserved in case of an additional resource request for the first (or second) virtual machine.

If sufficient resources become available on the first computing device to fulfil the requirements of the third virtual machine, then conventionally there may be no migration of the third virtual machine to the first computing device. Thus, both computing devices remain operating with partially allocated resources. This is inefficient.

In addition, the current inadequate approaches to the allocation of resources within a host system and the migration of virtual machines, can lead to vulnerabilities in the event of component failure, security intrusions, fire, power failure, and the like.

There is, therefore, a need to provide new methods and systems for the more efficient allocation of resources of a host system.

Accordingly, embodiments of the present invention seek to ameliorate one or more problem associated with the prior art.

An aspect of the present invention provides an arrangement configured to allocate resources of a host system to one or more virtual machines, the arrangement comprising: an interface configured to receive a first request from a client system for a first amount of a resource of a host system to be allocated to a first virtual machine and to transmit confirmation to the client system of the allocation of the first amount of the resource; and a hypervisor module configured to allocate an amount of the resource of the host system to the first virtual machine, wherein the amount of the resource allocated to the first virtual machine is less than the first amount of the resource, such that at least a part of the first amount of the resource is available for allocation to a second virtual machine.

The interface may be further configured to receive a second request from a client system for a second amount of the resource of the host system to be allocated to a second virtual machine and to transmit confirmation to the client system of the allocation of the second amount of the resource; and the hypervisor module may be further configured to allocate the at least a part of the first amount of the resource to the second virtual machine. The amount of the resource allocated to the second virtual machine may be less than the second amount such that at least a part of the second amount of the resource may be available for allocation to a third virtual machine or the first virtual machine. The resource may include a memory resource. The resource may include a processing power resource. The resource may include a storage resource. The client system from which the first request is received may be a different client system from which the second request is received. The interface may include a network connection. The interface may include an internet connection and/or a local area network connection and/or a wide area network connection and/or a wireless network connection. The arrangement may further comprise a migration module configured to migrate the first virtual machine from a first part of the host system to a second part of the host system when the first virtual machine needs to use an amount of the resource which exceeds the amount of the resource allocated to the first virtual machine and there is not enough of the resource available in the first part of the host system to meet the needs of the first virtual machine. The host system may comprise a plurality of computing devices and the first and second parts of the host system may each comprise a respective computing device. The hypervisor module may be a module which is distributed between the plurality of computing devices. The hypervisor module may include a master hypervisor which is part of one of the computing devices or provided in another part of the host system. The hypervisor module may be subsequently configured to allocate a further amount of the resource to the first virtual machine. The further amount of the resource may be such that the amount of the resource allocated to the first virtual machine is substantially equal to the first amount of the resource. The further amount of the resource may be allocated after a period which is derived from information provided in the first request. The further amount of the resource may be allocated after a period which is determined my monitoring the use of the resource by the first virtual machine.

Another aspect of the present invention provides a host system comprising: an arrangement; and at least one computing device.

Another aspect of the present invention provides a method for allocating resources of a host system to one or more virtual machines, the method comprising: receiving, at an interface, a first request from a client system for a first amount of a resource of a host system to be allocated to a first virtual machine; transmitting to the client system, from the interface, confirmation of the allocation of the first amount of the resource; and allocating, using a hypervisor module, an amount of the resource of the host system to the first virtual machine, wherein the amount of the resource allocated to the first virtual machine is less than the first amount of the resource, such that at least a part of the first amount of the resource is available for allocation to a second virtual machine.

The method may further comprise: receiving, at the interface, a second request from a client system for a second amount of the resource of the host system to be allocated to a second virtual machine; transmitting to the client system, from the interface, confirmation of the allocation of the first amount of the resource; and allocating, using the hypervisor module, the at least part of the first amount of the resource to the second virtual machine. The amount of the resource allocated to the second virtual machine may be less than the second amount of the resource such that at least a part of the second amount of the resource is available for allocation to a third virtual machine or the first virtual machine. The resource may include a memory resource. The resource may include a processing power resource. The resource may include a storage resource. The client system from which the first request is received may be a different client system from which the second request is received. The interface may include a network connection. The interface may include an internet connection and/or a local area network connection and/or a wide area network connection and/or a wireless network connection. The method may further comprise: migrating, using a migration module, the first virtual machine from a first part of the host system to a second part of the host system when the first virtual machine needs to use an amount of the resource which exceeds the amount of the resource allocated to the first virtual machine and there is not enough of the resource available in the first part of the host system to meet the needs of the first virtual machine. The host system may comprise a plurality of computing devices and the first and second parts of the host system each comprise a respective computing device. The hypervisor module may be a module which is distributed between the plurality of computing devices. The hypervisor module may include a master hypervisor which is part of one of the computing devices or provided in another part of the host system. The method may further comprise subsequently allocating a further amount of the resource to the first virtual machine using the hypervisor module. The further amount of the resource may be such that the amount of the resource allocated to the first virtual machine is substantially equal to the first amount of the resource. The further amount of the resource may be allocated after a period which is derived from information provided in the first request. The further amount of the resource may be allocated after a period which is determined my monitoring the use of the resource by the first virtual machine.

Another aspect of the present invention provides a computer readable medium with instructions stored thereon which, when executed by a computing device, cause the operation of a method.

Another aspect of the present invention provides an arrangement for use in managing resources of a plurality of computing devices, the arrangement comprising: an interface configured to receive an indication of a parameter associated with a first computing device of the plurality of computing devices; and a migration module configured to migrate a virtual machine, or part of a virtual machine, from the first computing device to a second computing device in response to the indication received by the interface.

The interface may be a sensor interface which is configured to receive an indication of a sensed parameter. The sensed parameter may include an indicator of fire in the vicinity of the first computing device. The indicator of fire may include the detection of smoke. The sensed parameter may include a temperature which is above a predetermined threshold value. The sensed parameter may include an indicator of power supply failure. The sensed parameter may include a power supply voltage. The sensed parameter may include an indicator of a BIOS battery failure or imminent failure. The sensed parameter may include a voltage of the BIOS battery falling below a predetermined threshold. The sensed parameter may include an indicator of an abnormal temperature of the first computing device. The sensed parameter may include an indicator of a higher than expected temperature for the level of operation of the first computing device. The sensed parameter may include a temperature of a case of the first computing device. The sensed parameter may include a temperature of a processing unit of the first computing device. The sensed parameter may include an ambient temperature in the vicinity of the first computing device. The sensed parameter may include an indicator of the failure of a fan or a decrease in fan speed below a predetermined threshold. The sensed parameter may include an indicator of a missing or detached or loose heat sink of a processing unit of the first computing device. The sensed parameter may include an indicator of a potential security issue. The sensed parameter may include an indicator that a case of the first computing device has been opened or has been opened without authorisation. The sensed parameter may include an indicator that a room in which the first computing device is located has been accessed without authorisation, the second computing device being located in a different room to the first computing device. The sensed parameter may include an indicator of an error in an error correction code for a memory of the first computing device. The sensed parameter may include an indicator of the imminent failure of a storage medium of the first computing device. The indication of a parameter may be an indication of that a more efficient computing device is available, the more efficient computing device being the second computing device. The indication of a parameter may be an indication of that a computing device is available which can be cooled more efficiently, that computing device being the second computing device. The indication of a parameter may be an indication of that the first computing device has been using resources below a predetermined level for a predetermined period of time. The sensed parameter may include an indicator of a symptom of a malicious network attack. The indication of a parameter may be an indication that a network interface data transfer speed of a network interface of the first computing device is below or will be below a predetermined threshold. The migration module may be configured to block the migration of a virtual machine to the first computing device in response to the indication received by the interface. An arrangement may further comprise an override interface which is configured to receive user input and, in response to the user input, to override the operation of the migration module. The migration module may be configured to shutdown the first computing device in response to the indication received by the interface. The virtual machine may include a migration requirement and the second computing device is selected from the plurality of computing devices based, at least in part, on the migration requirement. The migration requirement may include a security requirement for the second computing device. The migration requirement may include a location requirement for the second computing device. The migration requirement may include a resource requirement for the second computing device. The resource requirement may be a requirement for the provision of storage media configured in a RAID array.

Another aspect of the present invention provides a host system comprising: an arrangement; and a plurality of computing devices, the plurality of computing devices including the first and second computing devices.

Another aspect of the present invention provides a method of managing resources of a plurality of computing devices, the method comprising: receiving, at an interface, an indication of a parameter associated with a first computing device of the plurality of computing devices; and migrating, using a migration module, a virtual machine, or part of a virtual machine, from the first computing device to a second computing device in response to the indication received by the interface.

The interface may be a sensor interface which is configured to receive an indication of a sensed parameter. The sensed parameter may include an indicator of fire in the vicinity of the first computing device. The indicator of fire may include the detection of smoke. The sensed parameter may include a temperature which is above a predetermined threshold value. The sensed parameter may include an indicator of power supply failure. The sensed parameter may include a power supply voltage. The sensed parameter may include an indicator of a BIOS battery failure or imminent failure. The sensed parameter may include a voltage of the BIOS battery falling below a predetermined threshold. The sensed parameter may include an indicator of an abnormal temperature of the first computing device. The sensed parameter may include an indicator of a higher than expected temperature for the level of operation of the first computing device. The sensed parameter may include a temperature of a case of the first computing device. The sensed parameter may include a temperature of a processing unit of the first computing device. The sensed parameter may include an ambient temperature in the vicinity of the first computing device. The sensed parameter may include an indicator of the failure of a fan or a decrease in fan speed below a predetermined threshold. The sensed parameter may include an indicator of a missing or detached or loose heat sink of a processing unit of the first computing device. The sensed parameter may include an indicator of a potential security issue. The sensed parameter may include an indicator that a case of the first computing device has been opened or has been opened without authorisation. The sensed parameter may include an indicator that a room in which the first computing device is located has been accessed without authorisation, the second computing device being located in a different room to the first computing device. The sensed parameter may include an indicator of an error in an error correction code for a memory of the first computing device. The sensed parameter may include an indicator of the imminent failure of a storage medium of the first computing device. The indication of a parameter may be an indication of that a more efficient computing device is available, the more efficient computing device being the second computing device. The indication of a parameter may be an indication of that a computing device is available which can be cooled more efficiently, that computing device being the second computing device. The indication of a parameter may be an indication of that the first computing device has been using resources below a predetermined level for a predetermined period of time. The sensed parameter may include an indicator of a symptom of a malicious network attack. The indication of a parameter may be an indication that a network interface data transfer speed of a network interface of the first computing device is below or will be below a predetermined threshold. The method may further comprise blocking, using the migration module, the migration of a virtual machine to the first computing device in response to the indication received by the interface. The method may further comprise: receiving user input at an override interface, and in response to the user input, overriding the operation of the migration module. The method may further comprise shutting down, using the migration module, the first computing device in response to the indication received by the interface. The virtual machine may include a migration requirement and the second computing device is selected from the plurality of computing devices based, at least in part, on the migration requirement. The migration requirement may include a security requirement for the second computing device. The migration requirement may include a location requirement for the second computing device. The migration requirement may include a resource requirement for the second computing device. The resource requirement may be a requirement for the provision of storage media configured in a RAID array.

Another aspect of the present invention provides a computer readable medium with instructions stored thereon which, when executed by a computing device, cause the operation of a method.

Another aspect of the present invention provides an arrangement configured to allocate resources of a plurality of data storage media to a plurality virtual machines, the arrangement comprising: an interface configured to receive a first data access rate requirement for a first of the plurality of virtual machines and a second data access rate requirement for a second of the plurality of virtual machines; and a hypervisor module configured to compare the first and second data access rate requirements to stored data access rates for a first and a second data storage media associated with the plurality of computing devices, and to allocate resources of at least one of the first and second data storage media to the first and second virtual machines such that the first and second data access requirements are met.

The hypervisor module may be further configured to allocate one or more resources of a first and a second computing device of the plurality of computing devices to the first and second virtual machines. The hypervisor module may be further configured to allocate one or more resources of the first or second computing devices to a third of the plurality of virtual machines. At least one of the first and second data storage media may be a storage medium which is local to the first computing device. At least one of the first and second data storage media may be a storage medium which is local to the second computing device. At least one of the first and second data storage media may be a storage medium which is remote from the first computing device. At least one of the first and second data storage media may be a storage medium which is remote from the second computing device. Another aspect of the present invention provides a host system comprising: an arrangement; and a plurality of data storage media. Another aspect of the present invention provides a method for allocating resources of a plurality of computing devices to a plurality virtual machines, the method comprising: receiving, at an interface, a first data access rate requirement for a first of the plurality of virtual machines and a second data access rate requirement for a second of the plurality of virtual machines; comparing, using a hypervisor module, the first and second data access rate requirements to stored data access rates for a first and a second data storage media associated with the plurality of computing devices; and allocating resources of at least one of the first and second data storage media to the first and second virtual machines, using the hypervisor module, such that the first and second data access requirements are met. The method may further comprise allocating one or more resources of a first and a second computing device of the plurality of computing devices to the first and second virtual machines. The method may further comprise allocating one or more resources of the first or second computing devices to a third of the plurality of virtual machines. At least one of the first and second data storage media may be a storage medium which is local to the first computing device. At least one of the first and second data storage media may be a storage medium which is local to the second computing device. At least one of the first and second data storage media may be a storage medium which is remote from the first computing device. At least one of the first and second data storage media may be a storage medium which is remote from the second computing device.

Another aspect of the present invention provides a computer readable medium with instructions stored thereon which, when executed by a computing device, cause the operation of a method.

Another aspect of the present invention provides an arrangement configured to allocate one or more resources of one or more computing devices to a virtual machine, the arrangement comprising: an interface configured to receive a request for the allocation of one or more resources to the virtual machine, the request including information regarding one or more computer programs to be operated by or as a part of the virtual machine; and a hypervisor module configured to use the information regarding one or more computer programs to identify economic information associated with at least one of the computer programs, and to allocate one or more resources to the virtual machine based at least in part on the economic information.

The economic information may include information regarding a license fee dependent on the one or more resources allocated to the virtual machine. The one or more resources may include one or more processing units. The economic information may be part of the information regarding one or more computer programs. The economic information may be stored in a database. The information regarding one or more computer programs may include a substantially unique identifier for the or each computer program. The allocation of one or more resources may be based, at least in part, on a cost associated with the operation of the virtual machine. The cost may include a cost per user. The cost may include a government fee. The government fee may be a tax. The cost may include an energy cost.

Another aspect of the present invention provides a host system comprising: an arrangement; and one or more of computing devices.

Another aspect of the present invention provides a method of allocating one or more resources of one or more computing devices to a virtual machine, the method comprising: receiving, at an interface, a request for the allocation of one or more resources to the virtual machine, the request including information regarding one or more computer programs to be operated by or as a part of the virtual machine; using, at a hypervisor module, the information regarding one or more computer programs to identify economic information associated with at least one of the computer programs, and allocating, using the hypervisor module, one or more resources to the virtual machine based at least in part on the economic information.

The economic information may include information regarding a license fee dependent on the one or more resources allocated to the virtual machine. The one or more resources may include one or more processing units. The economic information may be part of the information regarding one or more computer programs. The economic information may be stored in a database. The information regarding one or more computer programs may include a substantially unique identifier for the or each computer program. The allocation of one or more resources may be based, at least in part, on a cost associated with the operation of the virtual machine. The cost may include a cost per user. The cost may include a government fee. The government fee may be a tax. The cost may include an energy cost.

Another aspect of the present invention provides a computer readable medium with instructions stored thereon which, when executed by a computing device, cause the operation of a method.

Another aspect of the present invention provides an arrangement for use in managing resources of a plurality of computing devices in response to a network attack, the arrangement comprising: an interface configured to receive an indication of a parameter associated with a first computing device of the plurality of computing devices; and a migration module configured to migrate a virtual machine, or part of a virtual machine, from the first computing device to a second computing device in response to the indication received by the interface, wherein the parameter includes an indicator of a symptom of an attack against the first computing device or a program operating on the first computing device.

The attack may be a network attack. The parameter may include an indication that a communication channel associated with the first computing device has received more than a predetermined number of messages over a predetermined period. The messages may include one or more connection requests. The messages may include one or more network ping messages. The messages may include one or more mangled or incomplete network messages configured to disrupt the operation of the first computing device.

The first computing device may be associated with a first network interface and the parameter includes an indicator of a symptom of an attack in relation to the first network interface and the second computing device may be associated with a second network interface which is distinct from the first network interface. The first and second network interfaces may be configured for connection to a local or wide area network. The local or wide area network may include a wired and/or a wireless network. The first and second computing devices may be both communicatively coupled to a backbone network which is independent of the first and second network interfaces and over which a virtual machine can be migrated. The parameter may include an indicator of a symptom of the operation of an unauthorised computer program on the first computing device. The parameter may include an indicator of an attack in relation to a first virtual machine operating on the first computing device. The migration module may be configured to migrate a second virtual machine to the second computing device, and to maintain the first virtual machine on the first computing device. The migration module may be configured to migrate the first virtual machine to the second computing device and the second computing device may be a quarantined computing device. The migration module may be configured to update one or more domain name service records in response to migration of a virtual machine.

Another aspect of the present invention provides a host system comprising: an arrangement; and a plurality of computing devices, the plurality of computing devices including the first and second computing devices.

Another aspect of the present invention provides a method of managing resources of a plurality of computing devices in response to a network attack, the method comprising: receiving, at an interface, an indication of a parameter associated with a first computing device of the plurality of computing devices; and migrating, using a migration module, a virtual machine, or part of a virtual machine, from the first computing device to a second computing device in response to the indication received by the interface, wherein the parameter includes an indicator of a symptom of an attack against the first computing device or a program operating on the first computing device.

The parameter may include an indicator of a symptom of a network attack. The parameter may include an indication that a communication channel associated with the first computing device has received more than a predetermined number of messages over a predetermined period. The messages may include one or more connection requests. The messages may include one or more network ping messages. The messages may include one or more mangled or incomplete network messages configured to disrupt the operation of the first computing device. The first computing device may be associated with a first network interface and the parameter includes an indicator of a symptom of an attack in relation to the first network interface and the second computing device may be associated with a second network interface which is distinct from the first network interface. The first and second network interfaces may be configured for connection to a local or wide area network. The local or wide area network may include a wired and/or a wireless network. The first and second computing devices may be both communicatively coupled to a backbone network which is independent of the first and second network interfaces and over which a virtual machine can be migrated, the method may further comprise migrating a virtual machine over the backbone network. The parameter may include an indicator of a symptom of the operation of an unauthorised computer program on the first computing device. The parameter may include an indicator of an attack in relation to a first virtual machine operating on the first computing device. Migrating a virtual machine, or part of a virtual machine, from the first computing device to a second computing device may comprise migrating a second virtual machine to the second computing device, and maintaining the first virtual machine on the first computing device. Migrating a virtual machine, or part of a virtual machine, from the first computing device to a second computing device may comprise migrating the first virtual machine to the second computing device wherein the second computing device is a quarantined computing device. The method may further comprise updating one or more domain name service records in response to migration of a virtual machine.

Another aspect of the present invention provides a computer readable medium with instructions stored thereon which, when executed by a computing device, cause the operation of a method.

Another aspect of the present invention provides an arrangement configured to allocate network interface resources to a virtual machine, the arrangement comprising: an interface configured to receive a first network interface requirement for a first virtual machine; and a hypervisor module configured to compare the first network interface requirement to stored network interface information for one or more network interfaces associated one or more computing devices, and to allocate resources of at least one of the one or more network interfaces to the first virtual machine such that the first network interface requirement is met.

The network interface requirement may include a network interface data transfer speed. The network interface requirement may include a network interface contention ratio. The network interface requirement may include a requirement for a dedicated network interface. The interface may be configured to receive a second network interface requirement for a second virtual machine, and the hypervisor module may be further configured to compare the second network interface requirement to stored network interface information for one or more network interfaces associated one or more computing devices, and to allocate resources of at least one of the one or more network interfaces to the second virtual machine such that the second network interface requirement is met. The network interface may include a local area network interface. The network interface may include a wide area network interface. The network interface may include a wired or a wireless network interface. There may be a plurality of computing devices, and the arrangement may further comprise a migration module which is configured to migrate one or more further virtual machines from a first of the plurality of computing devices to a second of the plurality of computing devices, in order to free sufficient network resources associated with the first computing device to allow the first network interface resource requirement to be met by one or more network interfaces associated with the first computing device.

Another aspect of the present invention provides a host system comprising: an arrangement; and one or more computing devices each of which is associated with one or more network interfaces.

Another aspect of the present invention provides a method of allocating network interface resources to a virtual machine, the method comprising: receiving, at an interface, a first network interface requirement for a first virtual machine; comparing, using a hypervisor module, the first network interface requirement to stored network interface information for one or more network interfaces associated one or more computing devices; and allocating resources of at least one of the one or more network interfaces to the first virtual machine such that the first network interface requirement is met.

The network interface requirement may include a network interface data transfer speed. The network interface requirement may include a network interface contention ratio. The network interface requirement may include a requirement for a dedicated network interface. The method may further comprise: receiving, at the interface, a second network interface requirement for a second virtual machine; comparing, using the hypervisor module, the second network interface requirement to stored network interface information for one or more network interfaces associated one or more computing devices; and allocating resources of at least one of the one or more network interfaces to the second virtual machine such that the second network interface requirement is met. The network interface may include a local area network interface. The network interface may include a wide area network interface. The network interface may include a wired or a wireless network interface. The method may further comprise: migrating, using a migration module, one or more further virtual machines from a first of a plurality of computing devices to a second of the plurality of computing devices, in order to free sufficient network resources associated with the first computing device to allow the first network interface resource requirement to be met by one or more network interfaces associated with the first computing device.

Another aspect of the present invention provides a computer readable medium with instructions stored thereon which, when executed by a computing device, cause the operation of a method.

Figure 2:
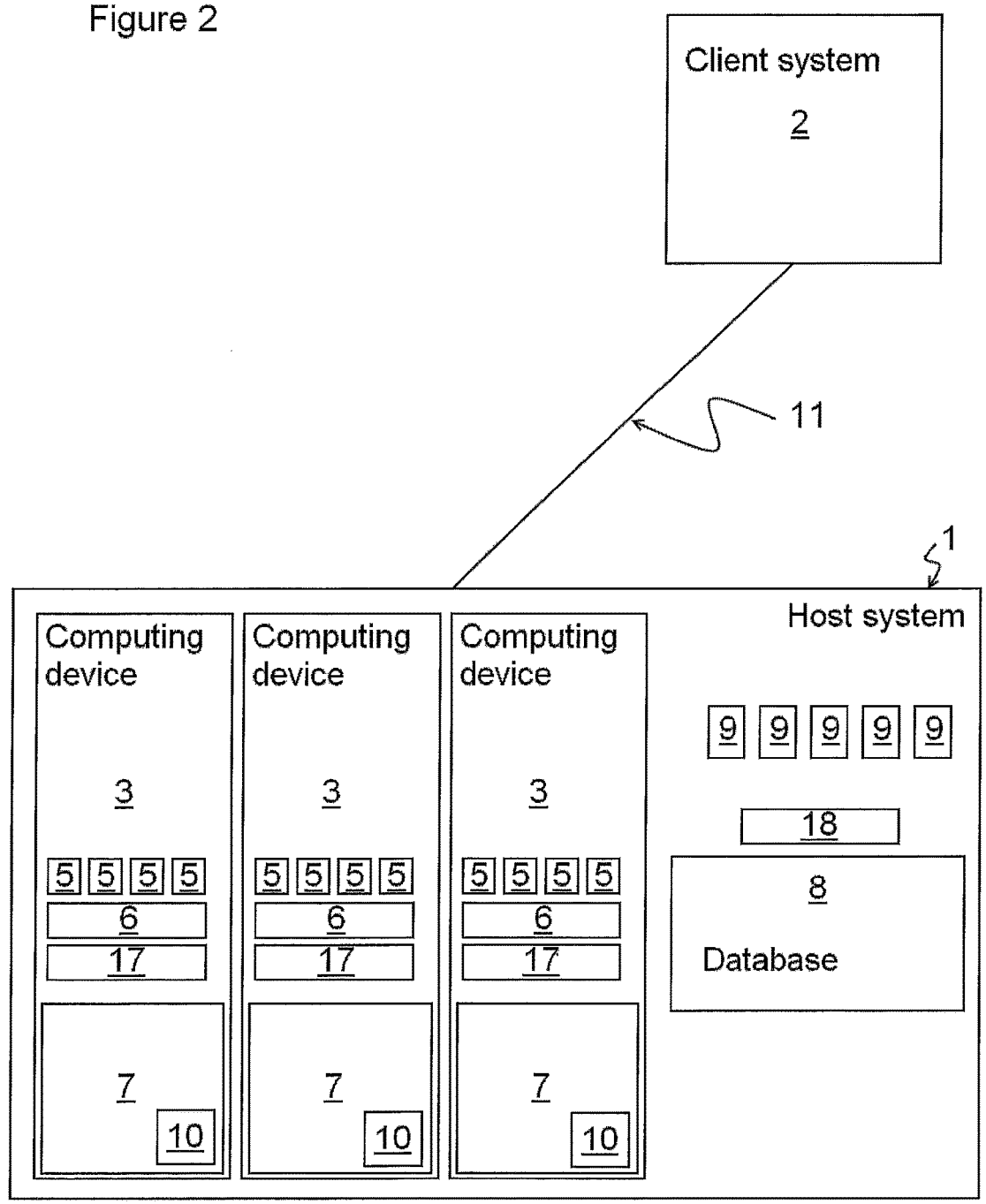
Figure 3:
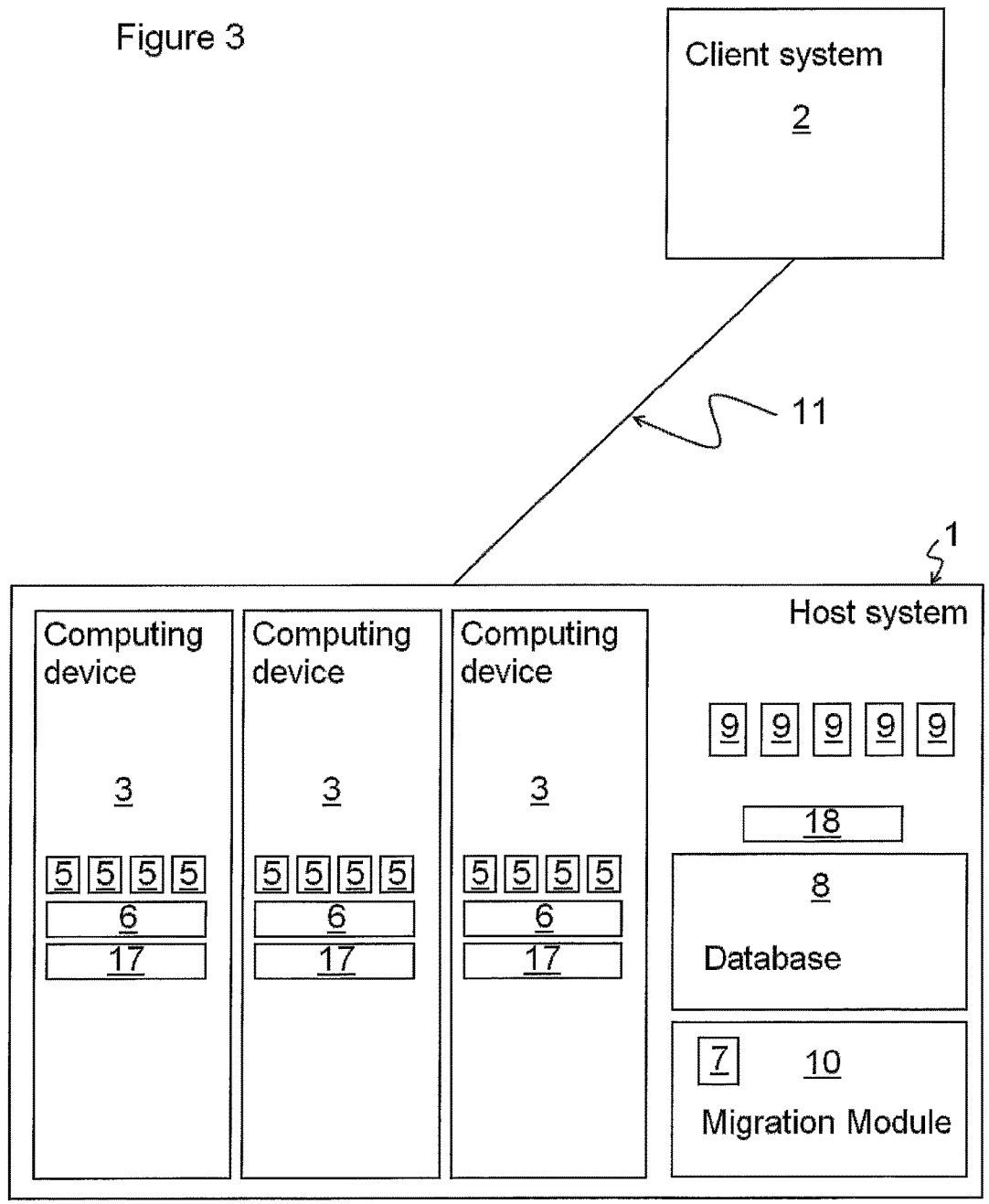
Figure 4:
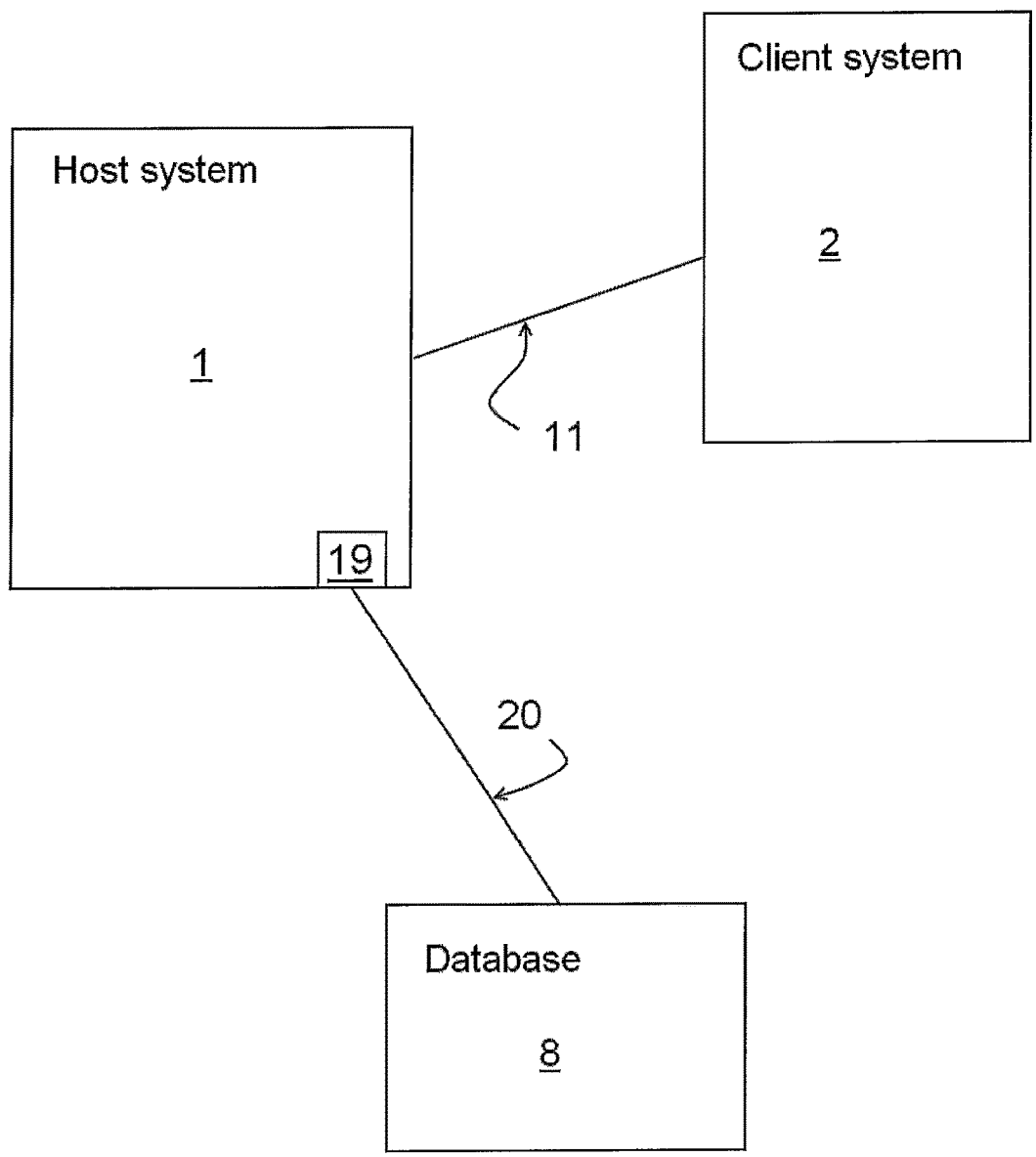
Figure 5:
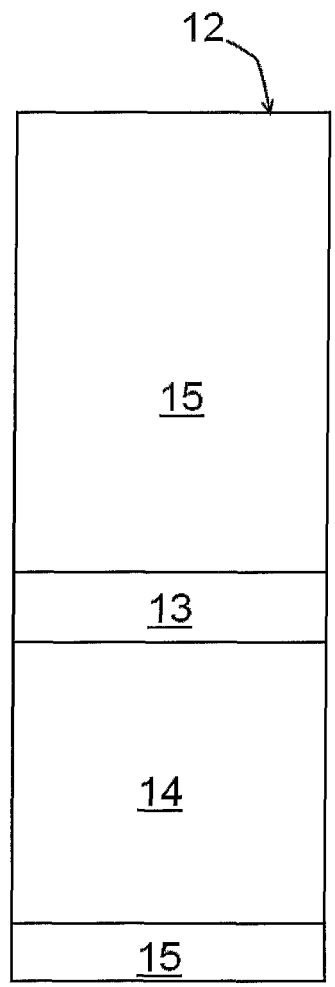
Figure 6:
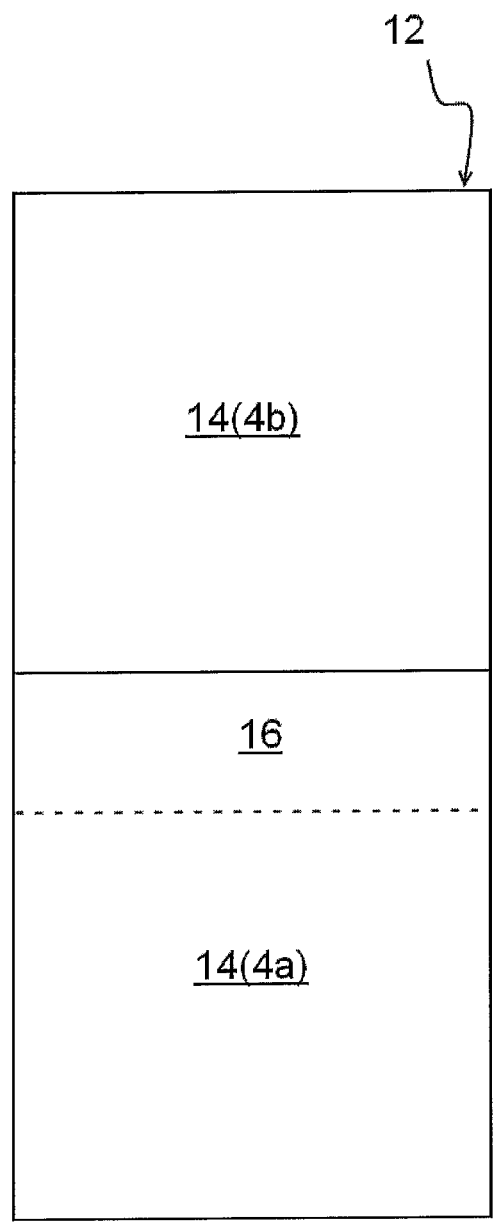

Embodiments of the present invention are described, by way of example only, with reference to the accompanying drawings in which:

FIG. 1 shows a host system and a client system;
FIG. 2 shows a host system and a client system;
FIG. 3 shows a host system and a client system;
FIG. 4 shows a host system, a client system, and a database;
FIG. 5 shows a representation of the allocation of one or more resources;
FIG. 6 shows a representation of the allocation of one or more resources using a throttling methodology; and
FIG. 7 shows a representation of a plurality of computing devices operating a plurality of virtual machines.

With reference to FIG. 1, embodiments of the present invention include a host system 1 and a client system 2. The client system 2 is communicatively coupled to the host system 1 by a communications link 11 which may include a network connection (which may be a local area network connection) and which may include the internet. The communications link 11 may include a wide area network (which may include the internet), and/or a local area network, and/or a virtual private network, and/or a wireless network (which may include a cellular telephone network). The client system 2 may include a mobile device coupled to the host system 1 by the communications link 11.

Figure 7:
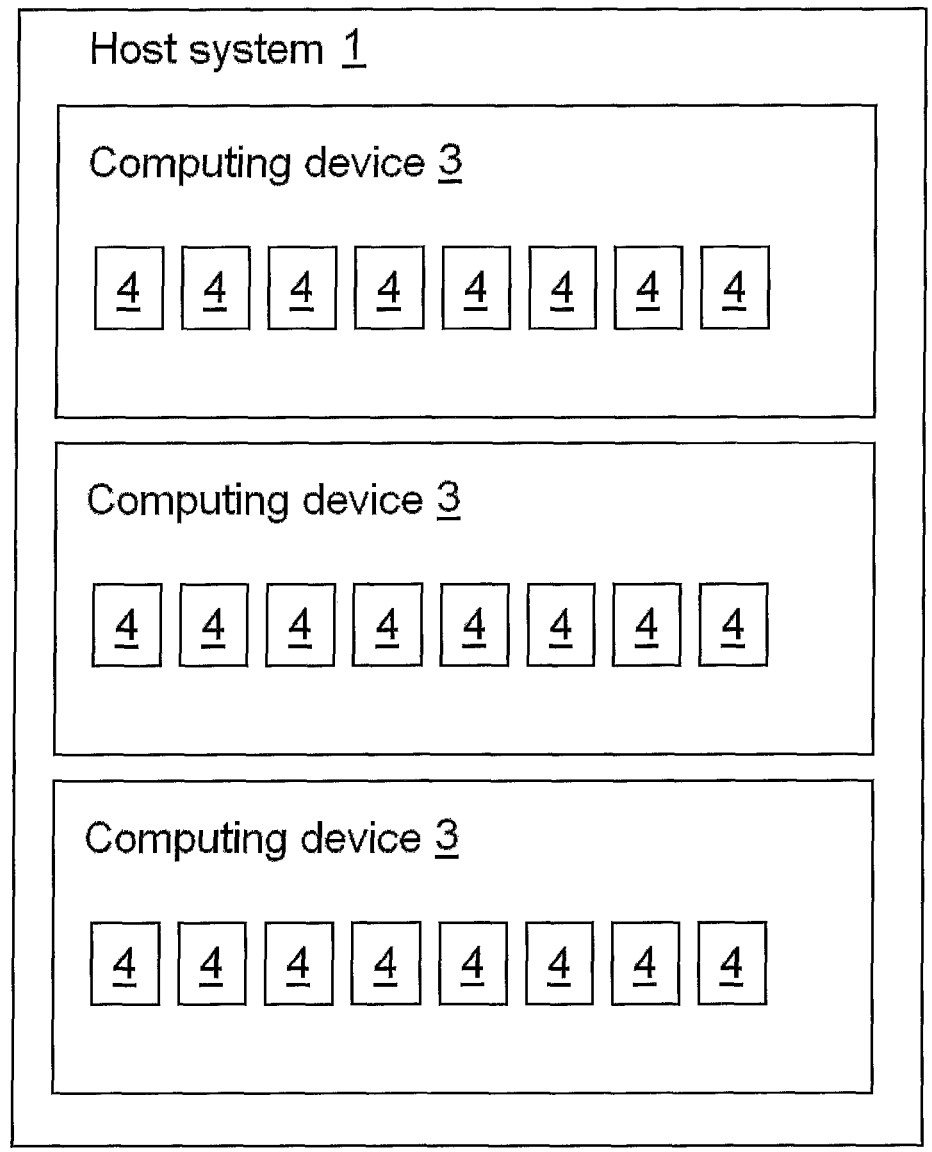

The client system 2 is configured to issue a request to the host system 1 asking the host system 1 to run or otherwise operate a virtual machine 4 using one or more resources 12 of the host system 2 (see FIGS. 5 and 7). The request is associated with a resource request for the virtual machine 4 which includes a request for the allocation of one or more resources of the host system 1 to the virtual machine 4—for example, processing power, memory resources, and/or space on a storage medium (e.g. a magnetic storage medium such as a hard disk or an optical storage medium).

The host system 1 is configured to receive the request from the client system 2 and to allocate one or more available resources 15 of the host system 1 to the operation of the virtual machine 4 (the one or more available resources 15 may, of course, be a part of the total resources 12 of the host system 1 if, for example, another part of the total resources 12 of the host system 1 has already been allocated to a different virtual machine 4).

The host system 1 is configured to issue confirmation to the client system 2, wherein the confirmation includes confirmation that the host system 1 has sufficient available resources 15 to operate the virtual machine 4 and that the one or more requested resources have been successfully allocated. In other words, the confirmation includes an indication that all of the one or more requested resources have been allocated.

Of course, if there are insufficient available resources 15, then an error is issued to the client system 2. This may result in the request being placed in a queue to await sufficient available resources 15 of the host system 1 to allow the host system 1 to operate the virtual machine 4.

The virtual machine 4 may then operate on the host system 1 using the one or more allocated resources under instruction from the client system 2.

The host system 1 includes a plurality of computing devices 3. Each computing device 3 includes one or more processing units 5 and associated memory 6—these are some of the resources of the computing device 3 and, hence, of the host system 1.

The or each processing unit 5 is configured to run a virtual machine 4, or a operations associated with a virtual machine 4, which may be the virtual machine 4 to which the request and confirmation relate.

The host system 1 may include one or more hypervisor modules 7 which may each be implemented as a computer program. The or each hypervisor module 7 is configured to manage one or more resources of the host system 1 (and, therefore, one or more resources of the one or more computing devices 3 of the host system 1).

A hypervisor module 7 may be provided for each of the plurality computing devices 3 or a hypervisor module 7 may be provided for a plurality of computing devices 3. In embodiments, a single hypervisor module 7 may be provided for substantially all of the computing devices 3 of the host system 1. Thus, each hypervisor module 7 is associated with one or more computing devices 3 and is configured to manage the allocation of one or more resources of those one or more computing devices 3 (and, hence, the host system 1).

Each hypervisor module 7 may be a Type 1 or a Type 2 hypervisor, and collectively a plurality of hypervisor modules 7 may include a mixture of both Type 1 and Type 2 hypervisors.

A Type 1 hypervisor is a hypervisor module 7 which is also known as a bare-metal type hypervisor. A Type 1 hypervisor combines the functions of an operating system and the hypervisor on one or more computing devices 3 of the host system 1. The combined hypervisor and operating system is relatively efficient because generally only those elements of the operating system are included which are required for the operation of the one or more computing devices 3. In embodiments including one or more hypervisor modules 7 which are Type 1 hypervisors, the or each Type 1 hypervisor module 7 may be associated with a single computing device 3.

A Type 2 hypervisor is a hypervisor module 7 which is separate from the operating system of the one or more computing devices 3. Thus, the operating system may include elements which are not specifically required for the operation of the one or more computing devices 3. A hypervisor module 7 in such embodiments operates as a program which is managed by the operating system in a conventional manner.

In embodiments of the present invention, the or each hypervisor module 7 is configured to receive one or more parameters associated with the host system 1 and, in particular, the or each computing device 3 of the host system 1. In embodiments, the or each hypervisor module 7 is configured to receive one or more parameters associated with only the computing devices 3 with which the or each hypervisor module 7 is associated. In embodiments, the or each hypervisor module 7 is configured to receive one or more parameters associated with other computing devices 3 (i.e. computing devices 3 other than those whose resources are managed by that hypervisor module 7).

The or each hypervisor module 7 may use the one or more parameters of the host system 1 to help to determine which of the one or more resources 12 of the host system 1 are to be allocated to the or each virtual machine 4.

The or each hypervisor module 7 may be communicatively coupled to a migration module 10. The migration module 10 is configured to communicate with the or each hypervisor module 7 in order to manage the operation of the or each hypervisor module 7 and, therefore, the allocation of one or more resources of the host system 1 to one or more virtual machines 4. This may include the communication of the one or more parameters between the or each hypervisor module 7 and migration module 10.

In embodiments, the migration module 10 is not a single module but comprises a distributed module (which may be a computer program) and each of a plurality of hypervisor modules 7 may include a portion of the migration module 10 (see FIG. 2, for example). In other words, the functions of the migration module 10 may be distributed between the hypervisor modules 7. In embodiments, the migration module 10 is provided as part of one of the hypervisor modules 7—in other words, a master hypervisor module is provided which coordinates the operations of all of the hypervisor modules 7.

Embodiments of the present invention include a database 8. The database 8 is configured to store information which is used by the or each hypervisor module 7 and/or the migration module 10 to manage the allocation of one or more resources to the or each virtual machine 4. This information may include the one or more parameters.

The database 8 may be provided as part of a hypervisor module 7 (e.g. as part of the master hypervisor, if provided). The database 8 may be a distributed database which is partially stored over a plurality of the hypervisor modules 7. The database 8 may be provided as part of the migration module 10.

The database 8 may be stored on a common computing device to the migration module 10. The common computing device may be a server of the host system 1 and that server may be distinct from the one or more computing devices 3.

The database 8 may be located remotely from the migration module 10 and/or the or each hypervisor module 7, and in embodiments may be located remotely from the client system 2 and/or the one or more computing devices 3 (see FIG. 4, for example).

The remotely located database 8 may be communicatively coupled to an interface 19 of the host system 1 via a communications link 20. In embodiments, the remotely located database 8 may be configured to receive the one or more parameters via the migration module 10 and/or the one or more hypervisor modules 7, or directly from one or more of the one or more computing devices 3.

One or more sensors 9 may be provided as part of the host system 1. The or each sensor 9 is communicatively coupled to at least one of the database 8, the migration module 10, one or more of the one or more hypervisors 7, and one or more of the one or more computing devices 3.

The or each sensor 9 is configured to monitor a condition of the host system 1 or a part thereof or a condition associated with the host system 1. For example, a sensor 9 may be configured to monitor the temperature of a computing device 3, or the temperature of a group of computing devices 3, or the temperature of a room containing the computing devices 3. In embodiments, a sensor 9 may be provided which is configured to detect smoke in the vicinity of a computing device 3, or some other indicator of fire. In embodiments, a sensor 9 may be provided which is configured to detect a likely unauthorised access to a room containing a computing device 3 or a cabinet containing a computing device 3.

In embodiments, information output by the or each sensor 9 is configured to be transmitted to the migration module 10.

The information output by the or each sensor 9 may include one or more of the one or more parameters (or information from which one or more of the one of more parameters can be derived by, for example, the migration module 10).

Embodiments of the present invention include methodologies for the allocation of resources to virtual machines 4. These methodologies may be implemented using one or more of the above described arrangements of apparatus or parts thereof.

For the purposes of the discussion herein, we refer to FIG. 5 by way of an explanation of the terminology used. A computing device 3 of the host system 1 has total resources 12 which are represented by the rectangle in FIG. 5. Any allocated resources of the total resources 12 are referred to as allocated resources and are represented in FIG. 5 by the portion 14 of the rectangle 12. Remaining resources of the computing device 3 (i.e. those not allocated) may be reserved resources 13 (which are free but not available for allocation for one reason or another) or may be available resources 15 (which are available for allocation on request). As will be appreciated, the resources of a computing device 3 of a host system are resources of the host system 1—wherein the total resources of the host system 1 are formed by the cumulative total resources 12 of the one or more computing devices 3 of the host system 1.

According to a throttling methodology, a client system 2 requests the allocation of one or more resources from the host system 1 for the operation of a first virtual machine 4a (see FIG. 6).

The request may include one or more of a memory requirement, a storage requirement, and a processing requirement. The first virtual machine 4a may have resource requirements which vary over time. For example, a payroll program may be needed continuously but large batches of data may be processed by the program periodically—e.g. overnight or towards the end of a month.

Therefore, the resource request may include the maximum required one or more resources so that the allocated one or more resources are sufficient to handle the operation of the first virtual machine 4a at all times.

In accordance with the throttling methodology, the migration module 10 and/or one or more hypervisor modules 7 may be configured to allocate the requested one or more resources to the operation of the first virtual machine 4a. The client system 2 requesting one or more resources for the first virtual machine 4a may, therefore, receive confirmation that the requested one or more resources have been allocated. A representation of the requested one or more resources of the total resources 12 of a the host system 1 (or a part, therefore, such as a computing device 3) is shown in FIG. 6 by the lower portion of the rectangle and labelled "14(4a)".

However, during operation, the migration module 10 and/or hypervisor module 7 is configured to manage the allocation of the one or more resources which were requested by the first virtual machine 4a such that an unused portion 16 of the one or more requested resources 14(4a) is allocated to a second virtual machine 4b (in response to a request). This re-allocation of one or more resources is performed such that the first virtual machine 4a is substantially blind to the re-allocation. As such, the first virtual machine 4a is not informed that not all of the one or more requested resources 14(4a) are available to it. The first virtual machine 4a remains substantially unaware that its allocated one or more resources are different from the requested one or more resources 14(4a). The re-allocation may be for a predetermined time period. In the depiction in FIG. 6, the second virtual machine 4b has been allocated one or more resources represented by the upper portion of the rectangle and labelled "14(4b)"; in addition, the second virtual machine 4b has also been allocated a portion 16 of the one or more resources 14(4a) requested by the first virtual machine 4a but which are not being used by the first virtual machine 4a.

Thus, the first and the second virtual machines 4a,b seemingly share one or more resources but do not use the shared sources simultaneously.

If the first virtual machine 4a requires the reallocated resources 16, then the migration module 10 and/or one or more hypervisor modules 7 may manage the migration of the first virtual machine 4a to a computing device 3 (i.e. another part of the host system 1) which has sufficient resources to allow the operation of the first virtual machine 4a. Alternatively, the migration module 10 and/or one or more hypervisor modules 7 may be configured to manage the migration of the second virtual machine 4b to another computing device 3 and the allocation of the re-allocated resources 16 to the first virtual machine 4. The term "re-allocated" has been used herein for ease of reference. Of course, it will be understood that the unused portion 16 of the one or more resources 12 may never have been allocated to the first virtual machine 4a or may have been allocated and then relinquished.

In embodiments in which the one or more resources being allocated include storage space on a computer readable storage medium, then a virtual machine 4 may be allocated, for example, a portion of a storage medium which has a capped maximum allocation associated therewith, wherein the cap is smaller than the requested storage requirement. If use of additional storage is required during operation of the virtual machine 4, over and above the allocation cap, then the migration module 10 and/or hypervisor module 7 may manage the allocation of new storage space and the migration of the storage resource allocated to the virtual machine 4 to the new storage resource—this may, in embodiments, free the originally allocated storage resource for reallocation to another virtual machine 4. In embodiments, the new storage resource may be associated with a different computing device 3 than the original storage resource allocation and may, therefore, entail the migration of the entire virtual machine 3 to from one computing device 3 to another computing device 3. In embodiments, the new storage resource allocation includes the original resource allocation. In embodiments, one or more virtual storage resources are used—such as a virtual hard disk. As will be appreciated the originally allocated storage resource could be the same storage medium as the newly allocated storage resource—or could be on a separate storage medium or could be on a separate partition of the same storage medium. As will be appreciated, the throttling methodology is also applicable to a storage resource allocation. The storage resources may include one or more hard disks which may include one or more dynamic disks. The storage resources may include one or more auto-sizing disks—such that only the portion of the disk needed is used rather than the whole volume.

As will be appreciated, one or more different resource allocations may be independently throttled.

Because the first virtual machine 4a is substantially unaware of the reallocation of a portion 16 of the requested one or more resources 14(4a), the virtual machine 4a does not require reconfiguring as a result of the reallocation or return of the this portion 16 of the one or more resources.

When requesting one or more resources, a client system 2 may provide an indication of the times at which lower or higher levels of the one or more resources will be required and the duration of these different levels of resource requirement. This information may be used by the migration module 10 and/or one or more hypervisor modules 7 to allocate one or more resources to reduce the likelihood of a conflict for the one or more resources. For example, the second virtual machine 4b may have an expected total operating duration which is equal to a period of low resource requirement for the first virtual machine 4a—meaning that both virtual machines 4a,b can share a portion of the same one or more resources 16 as discussed above without conflict. In embodiments, information regarding the duration and timing of any low or high resource requirements is input by a client system 2 operator and transmitted to the host system 1 with the request for one or more resources.

In embodiments, the operation of a virtual machine 4 is monitored for a period to determine a pattern of resource usage. A determined pattern of resource usage may include one or more periods during which a large portion of the requested resources are utilised and one or more periods during which a relatively small portion of the requested resources are utilised. Usage patterns may be gathered for more than one virtual machine 4 and may be gathered for more than one resource used by each virtual machine 4. This information may be stored in the database 8 or otherwise made available to the migration module 10 and/or one or more hypervisor modules 7 such that the migration module 10 and/or one or more hypervisor modules 7 can automatically determine how to share the one or more resources between two or more virtual machines 4 in the above described manner with little risk of conflict.

Pattern of usage information may be gathered by monitoring the resource usage of a virtual machine 4 every 15 minutes or when the allocated processing power resources have reached 100% over a predetermined period. Patterns may be determined by studying usage information for a period—such as a month—of operation of a virtual machine 4.

Of course, once a period of high resource requirement has passed, then the allocated one or more resources for a virtual machine 4 can be reduced and the freed one or more resources reallocated to another virtual machine 4. This, again, may be done such that the original virtual machine 4 is substantially blind to the re-allocation.

In embodiments, according to the throttling methodology, it will be understood that a plurality of virtual machines 4 may be using the one or more resources of a computing device 3. Each virtual machine 4 may be given a virtual allocation of one or more resources which may differ from the actual allocation of one or more resources. The virtual allocation of one or more resources, in this example, is the allocation which the virtual machine 4 is informed it has been given and the actual allocation of one or more resources is the portion of the virtual allocation which has actually been allocated to the virtual machine 4. Therefore, if 100% of the one or more resources 12 of a computing device 3 are allocated to four virtual machines 4 (for example) with each virtual machine 4 being allocated 25% of the total resources 12 but each virtual machine 4 uses 20%, or less, of the total one or more resources for a period, then the actual one or more resources allocated to the four virtual machines 4 could be reduced to 20% of the total (for example)—whilst the virtual allocation for each virtual machine 4 remains unchanged. Collectively, this frees 20% of the total one or more resources for re-allocation to another virtual machine 4. Accordingly, for that period, the computing device 3 could operate five virtual machines 4—for example. In other words, the actual one or more resources made available to each virtual machine 4 can be throttled so that the actual one or more resources allocated are sufficient to operate the virtual machine 4 for a period and the virtual allocation of one or more resources (i.e. the one or more resources which the virtual machine 4 is informed it has been allocated) remains unchanged.

Accordingly, part of the one or more resources are shared in the sense that one virtual machine 4 has been informed that it has been allocated the part of the one or more resources but that part has, in fact, been allocated to another virtual machine 4.

In embodiments, a plurality of computing devices 3 are provided which each have a resource boundary which represents the maximum level of a particular resource which can be allocated to a virtual machine 4. The throttling methodology may, therefore, encompass the migration of a virtual machine 4 between the computing devices 3 in order to ensure that the needs of the virtual machine 4 are met.

The throttling of resource allocations allows for more efficient use of one or more resources—as unused resources can be reallocated and used by another virtual machine 4. Because the virtual machines 4 are blind to the re-allocation, there is no need to reconfigure the virtual machines 4 as a result. The re-allocated one or more resources are returned to the virtual machine 4 which originally requested the one or more resources before or when they are required—or the original virtual machine 4 is migrated to a computing device 3 which has sufficient available one or more resources to operate the virtual machine 3. Of course, any new computing device 3 to which the virtual machine 3 is migrated may also use a throttling methodology such that the virtual machine 3 is allocated one or more resources of the new computing device 3 which have at least partially been re-allocated from another virtual machine 3 during a period in which the other virtual machine 3 is not using that portion of the one or more resources.

It will be appreciated that the throttling may be applied to resources individually such that each resource of the one or more resources is throttled individually. Of course, if a virtual machine 4 requires more of any particular resource than is available then the virtual machine 4 will need to be migrated (or another virtual machine 4 operating on the same computing device 3 will need to be migrated) even if the other resources are sufficiently abundant to meet the requirement.

Other resource allocation methodologies may be used independently of the throttling or with the throttling methodology described above.

For example, if a virtual machine 4 requires access to data quickly, then the virtual machine 4 may require the use of a storage medium 17 (e.g. a hard disk) which is located locally to a computing device 3 of the host 1) instead of a remote storage medium 18. A maximum data access rate for each storage medium 17,18 associated with a computing device 3 may be provided to one or more hypervisor module 7, the database 8, and/or the migration module 10. Indeed, the data access rate may be stored in one or more hypervisor modules 7, database 8, and/or migration module 10. The data access rate may be determined by a test operation which may be performed on the detection of a new storage medium and may be repeated periodically (e.g. when a configuration of an aspect of the associated computing device 3 changes). The data access rate may include separate read and write data rates. The data access rate not only takes into account the data access rate for the storage medium but also the impact of any communications interfaces and data buses through which the data or instructions may pass as part of a data access operation.

A request for one or more resources may include a data access rate requirement. If the requested data access rate exceeds a data access rate of a remote storage medium 18, then the migration module 10 and/or one or more hypervisor modules 7 may allocate one or more resources of a computing device 3 which has a suitable local storage medium 17 with a maximum data access rate which is equal to or exceeds the requested rate (the allocated one or more resources may include an available storage capacity). Otherwise, the migration module 10 and/or one or more hypervisor modules 7 may allocate one or more resources of a remote storage medium 18 or otherwise allocate the one or more resources of a computing device 3 which can operate with the remote storage medium 18.

If the requested data access rate is substantially equal to the data access rate for the local storage medium 17 of the computing device 3, then one or more resources of the computing device 3 cannot be allocated to another virtual machine 4 which requires access to the local storage medium 17.

If the requested data access rate is less than the maximum data access rate for the local storage medium 17, then another virtual machine 4 may be allocated one or more resources of the computing device 3 even if the virtual machine 4 requires use of the local storage medium 17 so long as the maximum data access rate for the local storage medium 17 is sufficient to service the required data access rates for both virtual machines 4.

Other virtual machines 4 may be allocated one or more resources of the computing device 3 if they can be serviced by a remote storage medium 18 (and access to the remote storage medium 18 is not detrimental to the access data rate of the local storage medium 17 to such an extent that the required data access rate for the local storage medium 17 cannot be met in respect of any of the virtual machines 4 requiring use of the local storage medium 17).

In embodiments, a request for allocation of resources includes one or more network interface requirements for one or more network interfaces to which the virtual machine 4

(to which the request for resources relates) requires access. The network interface requirement may be a required bandwidth for the network interface for allocation to the virtual machine 4, a required contention ratio for the network interface (i.e. that a particular interface is only shared by a maximum number of virtual machines 4), a requirement for a dedicated (i.e. unshared) network interface, and/or some other requirement for the data transfer speed of the network interface whose resources are being allocated to the virtual machine 4. The data transfer speed may be an upload or a download speed for the network interface.

The allocation of resources of a network interface may be managed by the migration module 10 and/or one or more hypervisor modules 7. The network interface may be a network interface card associated with a computing device 3. The migration module 10 and/or one or more hypervisor modules 7 compares the resource request with information regarding one or more network interfaces associated with one or more computing devices 3 (each computing device 3 may be associated with just one or a plurality of network interfaces). The information may include the specifications for that network interface (such as maximum possible data transfer speed), and/or actual recorded information regarding the historical data transfer performance of the network interface, and/or information regarding the resources of the network interface which are available (i.e. free) and information regarding the resources of the network interface which are allocated to, for example, other virtual machines 4.

If no network interface has sufficient available resources (or any network interface which does have sufficient available resources is unsuitable for some other reason—e.g. because some other resource requirement cannot be met), then the migration module 10 and/or one or more hypervisor modules 7 may manage the migration of one or more virtual machines 4 to different computing devices 3 so that sufficient network interface resources become available on a computing device 3 (and the resource requirements for the migrated virtual machines 4 are also met).

The network interface may include a wide and/or local area network interface and may be a wired or wireless network interface.

In embodiments, a sensor 9 or other arrangement (which may be computer program) is provided which senses a parameter indicative of the data transfer speed of a network interface during operation of a virtual machine 4. If the sensed parameter indicates that the data transfer speed of the network interface has dropped below a predetermined threshold for a virtual machine 4 (which may be set as part of the resource request), then the virtual machine 4 may be migrated to a different computing device 3 with a different network interface, or the virtual machine 4 may be allocated resources of another or a different network interface of the same computing device 3. The same action may be taken if there is an event which indicates that the data transfer speed will, in the future, drop below a threshold—for example, because resources of the network interface have been allocated to another virtual machine.

If a virtual machine 4 requires a high level of availability, then the virtual machine 4 may be allocated one or more resources which cannot be reallocated by the migration module 10 or a hypervisor module 7. This reduces the likelihood of a conflict and the need for migration of the virtual machine 4—thus improving the availability of the virtual machine 4.

The database 8 may include economic information associated with the operation of one or more virtual machines (or computer programs operated by or as part of one or more virtual machines). For example, the information may be information regarding license fees for one or more computer programs which may be operated by a virtual machine 4 or as part of a virtual machine 4. This information may include, for example, information regarding license costs for each processing unit 5 on which the computer program operates or the operation of which the computer program controls. This information may include, for example, information regarding license costs for each user of the computer program. The information may include information regarding a plurality of different license options for the same computer program. The information may be provided as part of a resource request and stored in the database 8 or may have been supplied separately and may already be available in the database 8 when a resource request is received (or may be retrieved from a separate source of information on receipt of a resource request). In embodiment, the information is not stored in the database 8 but is provided in a resource request.

A request for resources may, therefore, include information regarding one or more computer programs which are to be used during the operation of a virtual machine 4. This information may be used to identify one or more resources of a computing device 3 which are suitable for allocation to the virtual machine 4—e.g. because operation of the virtual machine (and the one or more computer programs) on that computing device 3 will be less expensive than operation on another computing device 3. This may be the case because the computing device 3 has fewer processing units 5 but each processing unit 5 has more cores, when compared to another computing device 3—the economic information for the one or more computer programs may indicate a license cost based on the number of processing units 5 (irrespective of the number of cores). Resources of the computing device 3 on which it would be most efficient to run the virtual machine 4 may, therefore, be allocated. In embodiments, the cost of a license based on the number of processing units 5 may be compared to a license based on the number of users (if available) and the least expensive license selected—in which case, allocation of resources to a computing device 3 with more processing units 5 may become desirable. The allocation of resources in such embodiments is managed by the migration module 10 and/or one or more hypervisor modules 7.

A resource request may, therefore, include an identifier (which may be a substantially unique identifier) for one or more computer programs which are to be operated by a virtual machine 4 or as part of the virtual machine 4. This identifier may be used to find the relevant economic information in the database 8 (if applicable).

In embodiments, the economic information includes information about a cost (such as a license fee, tax, or operating cost) which is based on another resource (other than the number of processing units 5) which is allocated to the virtual machine 4 which operates to the computer program or of which the computer program is a part.

In embodiments, the economic information includes information about a fee which is based on another factor. The other factor may be, as indicated above, a number of users. The other factor may be an energy efficiency of the or each computing device 3 whose one or more resources are allocated to the virtual machine 4—as such, a user can charge different fees for different energy efficiencies (e.g. a higher fee for using less energy efficient resources). The economic information may, in embodiments, be tax information (and the fee may be a tax). The other factor may include a geographical location of the or each computing device 3 whose one or more resources are allocated to the virtual machine 4—as such different geographical locations could incur different fees (for example, energy costs may vary from one location to another).

The allocation of one or more resources may also be based on the time of the allocation and information regarding the cost of a particular resource allocation at the time of allocation—for example, power costs may be lower in at night and, therefore, the allocation of resources may be deferred until a lower power costs apply. The time information could be couple to location information to take into account different time zones—such that lower cost power can be used without a deferment of the allocation of resources. All of this information may form part of the economic information on the basis of which an allocation of one or more resources may be made.

A sensor 9 of the one or more sensors 9 may be configured to detect the failure of a fan associated with a computing device 3. In the event of fan failure, the migration module 10 and/or one or more hypervisor modules 7 may be configured to migrate any virtual machines 4 operating on the computing device 3 to another computing device 3.

A sensor 9 of the one or more sensors 9 may be configured to detect the temperature associated with a computing device 3 increasing over a threshold value (e.g. a central processing unit temperature or a case temperature). In the event of excessive heat, the migration module 10 and/or hypervisor one or more hypervisor modules 7 may be configured to migrate any virtual machines 4 operating on the computing device 3 to another computing device 3. The threshold for a central processing unit temperature may be 85 degrees Celsius. The threshold for a case temperature may be 50 degrees Celsius.

A sensor 9 of the one or more sensors 9 may be configured to detect abnormal temperature conditions associated with a computing device 3. In the event of a detected abnormal temperature, the migration module 10 and/or one or more hypervisor modules 7 may be configured to migrate any virtual machines 4 operating on the computing device 3 to another computing device 3. An abnormal temperature condition may be a computing device 3 being hotter than neighbouring or adjacent computing devices 3. An abnormal temperature condition may be a computing device 3 becoming hot unexpectedly—for example, excessively hot for the level of use of the computing device 3. The sensor 9 in this embodiment may, of course, comprise an array of sensors 9 and a control unit which is configured to process the information from the array of sensors 9 to detect an abnormal condition (each sensor 9 in the array may be configured to sense a temperature associated with a different computing device 3 or a different part of a computing device 3). The abnormal temperature condition may be an abnormal ambient temperature associated with one or more computing devices 3 and which may indicate a cooling apparatus failure—for example.

A sensor 9 of the one or more sensors 9 may be configured to detect smoke or some other indicator of fire associated with a computing device 3. In the event of a detected fire indicator, the migration module 10 and/or one or more hypervisor modules 7 module may be configured to migrate any virtual machines 4 operating on the computing device 3 to another computing device 3.

A sensor 9 of the one or more sensors 9 may be configured to detect a fan speed of a fan associated with a computing device 3. In the event of the fan speed falling below a threshold or otherwise outside of a permitted range, the migration module 10 and/or one or more hypervisor modules 7 may be configured to migrate any virtual machines 4 operating on the computing device 3 to another computing device 3.

A sensor 9 of the one or more sensors 9 may be configured to detect a potential security issue associated with a computing device 3. In the event of a detected potential security issue, the migration module 10 and/or one or more hypervisor modules 7 may be configured to migrate any virtual machines 4 operating on the computing device 3 to another computing device 3. The potential security issue might be the unauthorised opening of a case of the computing device 3, and/or an unauthorised access to a room or facility in which the computing device 3 is located.

A sensor 9 of the one or more sensors 9 may be configured to detect a power supply failure associated with a computing device 3. In the event of a detected power supply failure, the migration module 10 and/or one or more hypervisor modules 7 may be configured to migrate any virtual machines 4 operating on the computing device 3 to another computing device 3. It is understood that the computing device 3 may have one or more power supplies. The power supply failure may be a complete failure of a power supply. The power supply failure may be a variation in the voltage or supply frequency which is outside of normal operating parameters. The sensor 9 may, as will be appreciated, be configured to detect power supply failure of an alternating current power supply (which may supply, for example, a switched-mode power supply) or of a direct current power supply. The direct current power supply may be a battery or other power storage device (as may be provided by an uninterruptable power supply) or may be, for example, the output of a switched-mode power supply. The sensor 9 may be associated with a switched-mode power supply of the computing device 3 and configured to monitor an aspect of the input or output of the switched-mode power supply. The sensor 9 may be configured to monitor an average voltage and/or may be configured to detect voltage spikes.

A sensor 9 of the one or more sensors 9 may be configured to detect a low voltage of a BIOS memory battery associated with a computing device 3. In the event of a low voltage being detected, the migration module 10 and/or one or more hypervisor modules 7 may be configured to migrate any virtual machines 4 operating on the computing device 3 to another computing device 3.

A sensor 9 of the one or more sensors 9 may be configured to detect failure of a BIOS memory battery associated with a computing device 3. In the event of a detected failure, the migration module 10 and/or one or more hypervisor modules 7 may be configured to migrate any virtual machines 4 operating on the computing device 3 to another computing device 3.

A sensor 9 of the one or more sensors 9 may be configured to detect an error in correction code (e.g. EEC) of memory associated with a computing device 3. In the event of a detected error, the migration module 10 and/or one or more hypervisor modules 7 may be configured to migrate any virtual machines 4 operating on the computing device 3 to another computing device 3.

A sensor 9 of the one or more sensors 9 may be configured to detect a loose or missing heat sink associated with a computing device 3. In the event of a detected problem with a heat sink, the migration module 10 and/or one or more hypervisor modules 7 may be configured to migrate any virtual machines 4 operating on the computing device 3 to another computing device 3.

As will be appreciated, one or more of the one or more sensors 9 may be configured to monitor an aspect of the health of the computing device 3 or devices 3 of the host system 1. In the event of an indication that the health of a computing device 3 is failing or may be about to fail, then the migration module 10 and/or one or more hypervisor modules 7 can migrate any virtual machines 4 which may be running on the computing device 3 to a healthier device 3 in an effort to avoid the loss of data or disrupted service by the host system 1 to the client system 2. The health of the computing device 3 may include the health of a storage medium 17,18 associated with the computing device and an indication of failing health may be an indication of imminent failure of the storage medium 17,18.

In embodiments, a sensor 9 of the one or more sensors 9 (which may include a computer program which is operated by the host system 1) is configured to identify symptoms of an attack which may be a network attack and which may be a malicious attack—in other words an electronic attack rather than a physical security breach such as unauthorised access to a cabinet of a computing device 3.

For example, the sensor 9 may detect a significant bandwidth restriction on a communications link associated with the host system 1 as a result of excessive use of the communications link/channel—as might be witnessed in a denial of service attack. The sensor 9 may be configured to monitor the number of communications (i.e. messages) received on a communications like over a predetermined period. If the total number of messages exceeds a predetermined number during that period, then the sensor 9 may issue a signal indicating a potential attack. The messages may include, for example, requests for connections, ping messages, or mangled or incomplete messages (which are configured to disrupt the operation of a virtual machine 4 and/or the computing device 3 on the virtual machine 4 is operating).

The attack may be targeting one or more of the virtual machines 4 operated by the host system 1 but may not be targeting all of the virtual machines 4 operated by the host system 1. However, if a first virtual machine 4 shares resources with a second virtual machine 4, then an attack against the first virtual machine 4 may also be detrimental to the operation or security of the second virtual machine 4. Accordingly, the migration module 10 and/or one or more hypervisors 7 may be configured to migrate the or each virtual machine 4 which is not under attack to another computing device 3 or computing devices 3 to reduce or eliminate the impact of the attack on the or each virtual machine 4 which is not the target of the attack. As will be appreciated, if a plurality of computing devices 3 share various resources (e.g. network connections and the like), then this may involve the migration of a virtual machine 4 not only to another computing device 3 but to another computing device 3 which does not share a resource with the computing device 3 hosting the virtual machine 4 which is under attack. In such examples, the sharing of certain resources is acceptable if this does not substantively impact the operation of the computing device 3 to which the virtual machine 4 is migrated (for example, resources such as a power source or cooling apparatus may be acceptably shared with a computing device 3 hosting a virtual machine 3 which is under attack).

In the event of detection of an attack (or a likely attack), the migration module 10 and/or one or more hypervisors 7 may also manage the reallocation of network resources of the host system 1 to the or each computing device 3. For example, a network connection may be disabled and a new network connection enabled. The migration module 10 and/or one or more hypervisors 7 may also be configured to manage updates to, for example, one or more domain name service records in order to maintain (or substantially maintain) access to the or each computing device 3. As such any domain name service records may be configured to be dynamic and have a low time-to-live—to ensure changes are identified by the client system 2 quickly.

In embodiments, the or each computing device 3 and/or other part of the host system 1 has at least two network connections. A first of the two network connections is used for connection to a first network (which may be a wide area network (which may include the internet), and/or a local area network, and/or a virtual private network, and/or a wireless network (which may include a cellular telephone network)). The second of the two network connections is used for a connection to a backbone network which is used for internal communications within the host system 1. In embodiments, the backbone network is not accessible via the internet or another wide area network. In embodiments, the backbone network is directly not accessible via the internet or another wide area network. The backbone network may be used by the migration module 10 and/or one or more hypervisor modules 7 to migrate virtual machines 4 between computing devices 3 and even, in embodiments, between host systems 1 (if a plurality of host systems 1 is connected to the same backbone network). Accordingly, the backbone network may be used to migrate virtual machines 4 in a manner which is substantially unimpeded by a network attack over the first network. The migration may be to a computing device 3 (or host system 1) which has an independent connection to the first network such that a virtual machine 4 which uses the first network can be migrated and connection to the first network re-established through the independent connection. In this sense, "independent" means sufficiently separate that an attack via one network connection will not have a substantive impact on the operation of an independent network connection.

In embodiments, a host system 1 may be divided such that a network between the components of the host system 1 (e.g. between the computing devices 3) is segmented. In such embodiments, an arrangement may be provided to isolate a particular segment of the network. This arrangement may be part of the migration module 10, for example. Isolation may comprise the disconnection of that segment from the rest of the network. Isolation may mean that resources serviced by that network segment are not allocated to new virtual machines 4 (other than those which have already been allocated the resources). Isolation may mean that communications between that segment and the rest of the network are monitored and filtered. Isolation may mean that one or more virtual machines 4 which have been allocated resources serviced by that segment (e.g. one or more computing devices 3) are migrated such that they are allocated resources serviced by another network segment.

In embodiments, if an attack is detected against a virtual machine 4, then that virtual machine 4 may be migrated to a computing device 3 which is a quarantined computing device—the quarantined computing device being configured to limit the impact of the attack on other virtual machines 3. The quarantined computing device may be an isolated computing device which is isolated from one or more other computing devices 3 (and in some cases all of the other computing devices 3) of a host system 1—such that the quarantined computing device does not share any processing, and/or memory, and/or storage medium, and/or communications resources with any other computing devices of the host system 1 (or shares such resources only with other quarantined computing devices).

The attack may be a network attack—such as a denial of service attack—or could be a virus (i.e. the operation of an unauthorised computer program). An unauthorised computer program may be detected, for example, based on the content of the computer program and/or its operational behaviour (compared to known malicious programs).

As will be appreciated, such measures as described above can be used to seek to reduce the impact of an attack on virtual machines 4 (or computing devices 3) which are not the target of the attack. Indeed, if an attack is more generally targeted at a host system 1, for example, then these approaches can be used to seek to reduce the impact the attack on all virtual machines 4 which are allocated resources of that host system 1 (which may mean that they are migrated to a new host system 1).

In embodiments, the migration module 10 and/or one or more hypervisor modules 7 are provided with information regarding an efficiency of an aspect of the operation of the or each computing device 3 or group of computing devices 3 of the host system 1. For example, the information may include layout information for all or part of the host system 1 with respect to a cooling apparatus associated with the host system 1 and/or rooms in which the or each computing device 3 is located. Accordingly, the migration module 10 and/or hypervisor module 7 may use this information to migrate one or more virtual machines 4 to a more efficient computing device 3. This may be a more modern computing device 3 or a computing device 3 which otherwise incorporates energy saving technology. In embodiments, this migration includes the migration of one or more virtual machines 4 to a computing device 3 (or group thereof) which is more efficient to cool—perhaps because it is located in a smaller room which has an independently controllable cooling apparatus or perhaps because a computing device 3 or group thereof are located in a part of a room which is near a part of the cooling apparatus or which is otherwise generally cooler than another part. The cooling apparatus operation may be adjusted to reduce the cooling in areas adjacent computing devices 3 which are not being used or which have low usage (e.g. 20% or less of their total resources 12). The cooling apparatus operation may be adjusted to increase the cooling in areas adjacent computing devices 3 which are being used heavily. Embodiments of the present invention, therefore, encompass the cooling apparatus which may be linked to the migration module 10 and/or one or more hypervisor modules 7 to provide more efficient cooling. The cooling apparatus may be an air cooling apparatus or a liquid cooling apparatus associated with the host system 1.

In embodiments, the one or more sensors 9 may include one or more temperature sensors which are configured to monitor a temperature associated with one or more parts of the host system 1 (which may be, for example, one or more computing devices 3 of the host system 1). A control arrangement may be provided which is communicatively coupled to the one or more temperature sensors and the cooling apparatus. As a result of a sensed increase in temperature of a part of the host system 1 (e.g. one or more computing devices 3) above a predetermined threshold, the control arrangement may be configured to control the cooling apparatus to increase the level of cooling associated with the part of the host system 1—seeking to reduce the temperature of that part of the host system 1. The control arrangement may be part of the migration module 10. In the event that the cooling level of a part of the host system 1 is increased but an acceptable temperature reduction is not achieved, then the migration module 10 and/or one or more hypervisor modules 7 may migrate one or more virtual machines 4 associated with that part of the host system 1 to another part of the host system 1—seeking to reduce the load on the hot part of the host system 1 to reduce the operating temperature of that part of the host system 1.

The or each temperature sensor may be associated with a rack of a computing device 3 of the host system 1.

The control arrangement may be configured to identify one or more parts of the host system 1 which are prone to excessive temperatures as a result of their operation and may issue an alert indicating that maintenance personnel should service the or each part of the host system 1 and/or the cooling apparatus associated therewith (servicing may include upgrading).

If a migration module 10 and/or hypervisor module 7 is configured to migrate one or more virtual machines 4 from a computing device 3, then the migration module 10 and/or one or more hypervisor modules 7 may prohibit the allocation of the resources of that computing device 3 in response to new requests—e.g. for a fixed period or until the reason for the migration no longer applies.

An interface may be provided which allows a host operator to override decisions by a migration module 10 and/or one or more hypervisor modules 7 to migrate one or more virtual machines 4. Thus, for example, if there is an error with a sensor 9 and a false indicator of fire detected by the sensor 9, then the operator can use the interface to override the migration of the or each virtual machine 4 associated with the computing device 3 to which the sensor 9 relates.

A migration module 10 and/or hypervisor module 7 may be configured to migrate one or more virtual machines 4 from a computing device 3, if the resource usage by the virtual machine 4 is low for a predetermined period of time—particularly if that virtual machine 4 is the only virtual machine 4 operating on the computing device 3.

A migration module 10 and/or hypervisor module 7 may be configured to migrate a plurality of virtual machines 4 from one or more computing device 3, sequentially in order to provide a balanced load for the computing device 3 (both those from which the virtual machines 4 are being migrated and those to which the virtual machines 4 are being migrated). A user may specify a requirement for balanced loading in this manner.

If migration of a virtual machine 4 is not possible, then the migration module 10 and/or hypervisor module 7 may attempt to shutdown the virtual machine 4. Shutting down the virtual machine 4 may, for example, comprise a controlled shutdown which may include the recording of the current state of the virtual machine 4 in a storage medium—which may be a local storage medium 17 and/or a remote storage medium 18. The recording of the current state of the virtual machine 4 may include the recording of the current state of all or part of the computing device 3—e.g. the contents of registers and the like. If recorded in a remote storage medium 18, then that storage medium 18 may be remote from the computing device 3 (e.g. in a different room or facility) in case the reason for the migration is likely to cause damage to a local storage medium 17. In this instance, the remote storage medium 18 may also be a storage medium which is remote from the computing device 3 from which a virtual machine 4 is being migrated but may be local to another computing device 3.

After migration of all virtual machines 4 from a computing device 3, the host system 1 may shutdown the computing device 3.

In some embodiments, the virtual machine 4 may be provided with an integrity indicator. The integrity indicator may indicate to the hypervisor module 7 and/or migration module 10 that the virtual machine 4 must be migrated (if possible) and/or the state of the virtual machine 4 (or computing device 3) recorded before the computing device 3 is shutdown. The integrity indicator may indicate to the hypervisor module 7 and/or migration module 10, that the virtual machine 4 can be terminated without such steps being performed. The integrity indicator may be provided by the client system 2 as part of the request for resources.

In certain circumstances, it may also be necessary for the host system 1 to be shutdown in its entirety. In embodiments, the host system 1 is not shutdown in its entirety until substantially all virtual machines 4 have been shutdown or their state recorded or otherwise terminated (in accordance with the integrity measure if provided).

A virtual machine 4 may have one or more requirements associated with the resources which are allocated thereto. These may include, for example, that the computing device 3 whose resources are allocated to the virtual machine 3 has redundant fans or is in a secure location or in a particular country or region of a country. Another requirement may be that the computing device 3 has memory configured in a RAID array. When allocating resources or migrating a virtual machine 4, therefore, a hypervisor module 7 and/or migration module 10 may take such requirements into account. The requirements may be indicated as essential— i.e. requirement which must be met—or preferred—i.e. requirements which should be met if possible.

Thus, a client system 2 can request a particular security level or backup provision when requesting resources. In addition, if a particular virtual machine 4 would contravene export laws if operated by a computing device 3 outside of a particular territory, then the client system 2 can ensure that the computing device 3 is not exported outside of the particular territory. In embodiments, the requirement is stored in the database 9 and/or the migration module 10 and/or one or more hypervisor modules 7.

A do not disturb period could be associated with a computing device 3 and/or virtual machine 4 during which migration is prohibited. In embodiments, the do not disturb period is stored in the database 9 and/or the migration module 10 and/or one or more hypervisor modules 7.

As will be understood, the one or more parameters of the host system 1 may be used to determine the migration of a virtual machine 4 from a first of the computing devices 3 to a second of the computing devices 3.

The one or more parameters may be provided over an Intelligent Platform Management Interface (IPMI) which uses a System Management Bus (SMBUS) Interface. Thus, the parameters may be provided by a mechanism which is not dependent on the use of a particular operating system—for example.

A hypervisor module 7 may be a Xen, Hyper-V or ESX hypervisor or may include components thereof.

As will be appreciated, the role of the or each hypervisor modules 7 and the migration module 10 may be altered such that the functions of one or more of the hypervisor modules 7 are undertaken by the migration module 10 and vice versa.

The host system 1 may include the one or more sensors 9 or respective interfaces which are configured to be communicatively coupled to the one or more sensors.

The client system 2 may comprise a computing device having a processing unit and memory. The client system 2 has an interface which is configured to be communicatively coupled to the host system 1 via the communications link 11. The client system 2 may include one or more user interface devices—such as a keyboard and mouse—to allow a user to interact with the client system 2. The client system 2 may include a display which is configured to display a graphical user interface. The graphical user interface may present one or more options to the user to control aspects of the operation of the client system 2 and/or the host system 1, including the submission of requests to the host system 1.

As will be understood, the various migration rules set out above may be implemented in any combination.

It will be appreciated that migration of a virtual machine 4 from a first computing device 3 to a second computing device 3 also requires that other resource requirements of the virtual machine 4 will be met by the second computing device 4—e.g. a memory requirement. A decision regarding a migration of a virtual machine 4 or a plurality of virtual machines 4 may include a comparison between a plurality of distributions of virtual machines 4 throughout a plurality of computing devices 3. As such a particular distribution may be selected because it results in an overall efficiency improvement for the host system 1.

Migration of virtual machine 4 may include the use of dynamic memory migration.

The virtual machine 4 may include an operating system provided by Microsoft® such as Windows Server 2008—e.g. R2 Enterprise edition SP1.

Embodiments of the present invention may be applied to the operation of cloud computing systems. The host system 1 may, therefore, be a cloud computing system which may be located on one or more physical sites which may be at different geographical locations.

When used in this specification and claims, the terms "comprises" and "comprising" and variations thereof mean that the specified features, steps or integers are included. The terms are not to be interpreted to exclude the presence of other features, steps or components.

The invention claimed is:

1. A host system for allocating one or more resources of one or more computing devices to a virtual machine, the host system comprising:
   an interface configured to receive a request for the allocation of the one or more resources to the virtual machine, the request including a unique identifier for each of the one or more computer programs to be operated by or as a part of the virtual machine and economic information including: a license cost for each of the one or more computer programs that is based on the one or more resources allocated to the virtual machine, and a fee based on a number of users of the virtual machine; and
   a processor configured to:
      use the unique identifier for each of the one or more computer programs to identify one or more available resources of the one or more computing devices for allocation to the virtual machine; and
      allocate the identified one or more available resources to the virtual machine based at least in part on the economic information to minimize a total cost of operating the virtual machine.

2. The host system of claim 1, wherein the economic information further includes a tax.

3. The host system of claim 1, wherein the license cost for each of the one or more computer programs is based on a number of processing units allocated to each computer program.

4. The host system of claim 1, wherein the fee is further based on an energy efficiency factor associated with each of the one or more computing devices.

5. The host system of claim 1, wherein the total cost of operating the virtual machine includes an energy or power cost.

6. The host system of claim 1, wherein the allocation of the identified one or more available resources factors in a cost based on a time of allocation and a location of the identified one or more available resources.

7. A method of allocating one or more resources of one or more computing devices to a virtual machine, the method comprising:
receiving, at an interface, a request for the allocation of the one or more resources to the virtual machine, the request including a unique identifier for each of the one or more computer programs to be operated by or as a part of the virtual machine and economic information including: a license cost for each of the one or more computer programs that is based on the one or more resources allocated to the virtual machine, and a fee based on a number of users of the virtual machine;
using, at a hypervisor module, the unique identifier for each of the one or more computer programs to identify one or more available resources of the one or more computing devices for allocation to the virtual machine; and
allocating, by the hypervisor module, the identified one or more available resources to the virtual machine based at least in part on the economic information to minimize a total cost of operating the virtual machine.

8. The method of claim 7, wherein the economic information further includes a tax.

9. The method of claim 7, wherein the license cost for each of the one or more computer programs is based on a number of processing units allocated to each computer program.

10. A The method of claim 7, wherein the fee is further based on an energy efficiency factor associated with each of the one or more computing devices.

11. The method of claim 7, wherein the total cost of operating the virtual machine includes an energy or power cost.

12. The method of claim 7, wherein the allocating of the identified one or more available resources factors in a cost based on a time of allocation and a location of the identified one or more available resources.

13. A non-transitory computer readable medium comprising instructions, when executed by a processor, performs a process of allocating one or more resources of one or more computing devices to a virtual machine, the process comprising:
receiving, at an interface, a request for the allocation of the one or more resources to the virtual machine, the request including a unique identifier for each of the one or more computer programs to be operated by or as a part of the virtual machine and economic information including: a license cost for each of the one or more computer programs that is based on the one or more resources allocated to the virtual machine, and a fee based on a number of users of the virtual machine;
using, at a hypervisor module, the unique identifier for each of the one or more computer programs to identify one or more available resources of the one or more computing devices for allocation to the virtual machine; and
allocating, by the hypervisor module, the identified one or more available resources to the virtual machine based at least in part on the economic information to minimize a total cost of operating the virtual machine.

14. The non-transitory computer readable medium of claim 13, wherein the economic information further includes a tax.

15. The non-transitory computer readable medium of claim 13, wherein the license cost for each of the one or more computer programs is based on a number of processing units allocated to each computer program.

16. The non-transitory computer readable medium of claim 13, wherein the fee is further based on an energy efficiency factor associated with each of the one or more computing devices.

17. The non-transitory computer readable medium of claim 13, wherein the total cost of operating the virtual machine includes an energy or power cost.

18. The non-transitory computer readable medium of claim 13, wherein the allocating of the identified one or more available resources factors in a cost based on a time of allocation and a location of the identified one or more available resources.

* * * * *